US008333830B2

(12) United States Patent
Kumar

(10) Patent No.: US 8,333,830 B2
(45) Date of Patent: Dec. 18, 2012

(54) COMPOSITES OF REPEAT SEQUENCE PROTEINS AND THEIR PREPARATION

(75) Inventor: Manoj Kumar, Fremont, CA (US)

(73) Assignee: Danisco US Inc., Palo Alto, CA (US)

( * ) Notice: Subject to any disclaimer, the term of this patent is extended or adjusted under 35 U.S.C. 154(b) by 763 days.

(21) Appl. No.: 11/990,658

(22) PCT Filed: Aug. 17, 2006

(86) PCT No.: PCT/US2006/032114
§ 371 (c)(1),
(2), (4) Date: Aug. 17, 2009

(87) PCT Pub. No.: WO2007/024618
PCT Pub. Date: Mar. 1, 2007

(65) Prior Publication Data
US 2009/0295022 A1 Dec. 3, 2009

Related U.S. Application Data

(60) Provisional application No. 60/710,098, filed on Aug. 22, 2005.

(51) Int. Cl.
*C08L 89/00* (2006.01)
(52) U.S. Cl. .................. 106/157.7; 106/157.8; 428/221
(58) Field of Classification Search ............... 106/157.7, 106/157.8; 428/221
See application file for complete search history.

(56) References Cited

U.S. PATENT DOCUMENTS

| 4,636,259 | A | 1/1987 | Hanaoka |
| 5,243,038 | A | 9/1993 | Ferrari et al. |
| 6,355,776 | B1 | 3/2002 | Ferrari et al. |
| 6,380,154 | B1 | 4/2002 | Cappello et al. |
| 6,521,690 | B1 | 2/2003 | Ross et al. |
| 6,783,805 | B2 | 8/2004 | Siegel et al. |
| 6,811,599 | B2 | 11/2004 | Fischer et al. |
| 7,297,678 | B2 | 11/2007 | Kumar et al. |
| 8,048,859 | B2 * | 11/2011 | Kumar et al. ............ 514/21.2 |
| 2004/0180027 | A1 * | 9/2004 | Kumar et al. ............ 424/70.14 |

FOREIGN PATENT DOCUMENTS

| CH | 545 831 A | 2/1974 |
| GB | 2 375 340 A | 11/2002 |
| JP | 08 073612 A | 3/1996 |
| WO | WO 2004/080426 A2 | 9/2004 |
| WO | WO 2007/080426 A1 | 7/2007 |
| WO | WO 2007/126411 A2 | 11/2007 |

OTHER PUBLICATIONS

Cerrai, et al., "New composites of hydroxyapatite and bioresorbable macromolecular material," *J Mater Sci Mater Med.*, 1999;10:283-9.
Dohren, et al.,Multifunctional Peptide Synthase, Chem.Rev. 97, 2675-2705(1997).
Ji, et al., "A novel urethane containing copolymer as a surface modification additive for blood contactmaterials," *J Mater Sci Mater Med.*, 2002;13:677-84.
Krikorian, V. et al., "Polypeptide-Based Nanocomposite: Structure and Properties of Poly(L-lysine)/Na+− Montmorillionite," *J. Polym. Sci. B: Polym. Phys*.2002, 40, 2579.
Mao et al, "Control of pore hydrophilicity in ordered nanoporous polystyrene using an AB/AC block copolymer blending strategy," *Faraday Discuss.*, 2005;128:149-62.
Usuki et al., "Synthesis of nylon 6-clay hybrid," *J. Mater. Res.*, V 8:5, May 1993, pp. 1179-1184.
Andersson, L. et al. "Large-scale synthesis of peptides." *Peptide Science* 55(3): 227-250, 2000.
Buchko, C.J. et al. "Surface characterization of porous, biocompatible protein polymer thin films." *Biomaterials* 22(11): 1289-1300, Jun. 1, 2001.
Buchko, C.J. et al. "Mechanical properties of biocompatible protein polymer thin films." *Journal of Materials Research* 15(1): 231-242, Jan. 2000.
Cappello, J. "Genetically Engineered Protein Polymers." In *Handbook of Biodegradable Polymers*, edited by A.J. Domb et al., pp. 387-414. Amsterdam, NL: Harwood Academic, 1997.
Cappello, J. et al. "In-situ self-assembling protein polymer gel systems for administration, delivery, and release of drugs." *Journal of Controlled Release* 53(1-3): 105-117, Apr. 30, 1998.
Megeed, Z. et al. "Genetically engineered silk-elastinlike protein polymers for controlled drug delivery." *Advanced Drug Delivery Reviews* 54(8): 1075-1091, Oct. 18, 2002.
Megeed, Z. et al. "Thermal Analysis of Water in Silk—Elastinlike Hydrogels by Differential Scanning Calorimetry." *Biomacromolecules* 5(3): 793-797, May 1, 2004.
Waite, J.H. et al. "Elastomeric gradients: a hedge against stress concentration in marine holdfasts?." *Philosophical Transactions of the Royal Society of London. Series B, Biological Sciences* 357(1418): 143-153, Feb. 28, 2002.
Wong, C.-H. et al. "New developments in enzymatic peptide synthesis." *Experientia* 47(11): 1123-1129, Dec. 1, 1991.
International Search Report dated Nov. 28, 2006.

* cited by examiner

*Primary Examiner* — David M Brunsman
(74) *Attorney, Agent, or Firm* — Danisco US Inc.

(57) ABSTRACT

A composite of one or more repeat sequence protein polymers and either one or more metal oxides or one or more plasticizers which alter the material properties of the repeat sequence protein polymers, including the morphology of the polymers as well as the elastic modulus and tensile strength. The morphology of the composite is aligned, generally parallel nanofibers.

18 Claims, 2 Drawing Sheets

COMPOSITES OF REPEAT SEQUENCE PROTEINS AND THEIR PREPARATION

CROSS REFERENCES TO RELATED APPLICATIONS

This application is a 371 filing of PCT/US2006/032114, filed Aug. 17, 2006, which application claims priority to U.S. Provisional Patent Application No. 60/710,098, filed Aug. 22, 2005.

FIELD OF THE INVENTION

The present invention relates to composites formed from the combination of repeat sequence protein polymers and metal oxides or plasticizers. The invention also provides for methods for the synthesis of such composite materials.

BACKGROUND OF THE INVENTION

The combination of polymers and inorganic filler materials is known for the production of composite materials with improved mechanical, thermal and barrier properties as compared to the unmodified polymer. A detailed discussion of composites can be found in Ajayan, P. M., *Composite Science and Technology* (Wiley, 2003).

The combination of polymers with metal oxides, also known as smectite clays or metal oxides, has been exploited as a means for the synthesis of composites. Comprehensive reviews on the subject are Alexandre and Dubois (2001) and Pinnavaia, T. J.; Beall, G. W. *Polymer Clay Composites* Wiley: New York, 2000. Smectite clays are described in Grim, R. E. *Clay Mineralology* $2^{nd}$ edition; McGraw-Hill: New York 1968.

Several methods for the synthesis of polymer clay composites have been described in the art, for example Nylon/clay composites first described by Usuki et al. (1993). A. Usuki, et al., "Synthesis of nylon 6-clay hybrid", J. Mater. Res., vol. 8, No. 5, May 1993, pp. 1179-1184. In this process nylon and montmorillonite are combined at high temperature.

A biodegradable thermoplastic material comprising a natural polymer, a plasticizer and an exfoliated clay having a layered structure and a cation exchange capacity of from 30-350 milliequivalents per 100 grams is described in U.S. Pat. No. 6,811,599 B2. The natural polymer is a polysaccharide.

A smectite clay modified with an organic chemical composition and a polymer is described in U.S. Pat. No. 6,521,690.

Composites formed from metal oxides and the synthetic homopolymer poly-L-lysine silicate composites have been described. (Krikorian, V. et al. *J. Polym. Sci. B: Polym. Phys.* 2002, 40, 2579).

Also known are composite materials formed by mixing hydroxyapatite (HA) and poly(epsilon-caprolactone-oxyethylene-epsilon-caprolactone) block copolymer (PCL-POE-PCL) to produce a resorbable material for biomedical applications, such as periodontal membranes. HA grains are surrounded by a film of PCL which grants close connection of HA grains within a copolymeric matrix. (Cerrai P. et al. J Mater Sci Mater Med. 1999; 10:283-9).

Another biomaterial application of composite materials is a penta-block-coupling polymer of warfarin-PEO-MDI-PEO-warfarin designed as a surface-modifying additive (SMA) for reversibly binding albumin by the simple coating of the novel SMA in SPU (Ji J et al. J Mater Sci Mater Med. 2002; 13:677-84).

Ordered nanoporous plastics with hydrophilic pore surfaces were prepared by the degradative removal of polylactide from a self-organized, multi-component composite containing two block copolymers: polystyrene-polylactide and polystyrene-polyethylene oxide. (Mao H., et al Faraday Discuss. 2005; 128:149-62).

Proteins make up the main structural elements of most organisms, using complex sequences of amino acids that lead to wide arrays of functionalities. One of the most intensely studied structural proteins, *Bombyx mori* silkworm silk, has generated significant interest because of its remarkable mechanical properties, which rival even spider silk. Elastin, another well-known structural protein, is found predominantly in the body's arterial walls, the lungs, intestines, and skin. Silk elastin like protein (SELP) is a recombinant protein consisting of alternating blocks of silk-like and elastin-like amino acids. The mechanical properties of recombinant proteins like SELP are often inferior or different to structural proteins found in nature.

The use of recombinant proteins in in vivo applications and in applications outside of the body may demand improved self-assembly of such recombinant proteins as well as improvements in a wide variety of protein properties.

SUMMARY OF THE INVENTION

The present invention is a composite comprising at least one repeat sequence protein polymer and at least one metal oxide or at least one plasticizer.

The repeat sequence protein polymer of the present invention has a formula comprising:

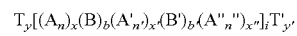

wherein T and T' each comprise an amino acid sequence of from 1 to 100 amino acids, wherein the amino acid sequence of T' is the same as or different from the amino acid sequence of T; y and y' are each an integer from 0 to 1, wherein the integer of y' is the same as or different from the integer of y; A, A' and A" are each individual repeating sequence units comprising from 3 to 30 amino acids, wherein the amino acid sequence of A' and the amino acid sequence of A" are the same as or different from the amino acid sequence of A; n, n', and n" are integers of at least 2 and not more than 250; x, x' and x" are each 0 or an integer of at least 1, wherein each integer varies to provide for at least 30 amino acids in the A', A' and A" individual repeating sequence units, and wherein the integer of x' and the integer of x" are the same as or different from the integer of x; B and B' each comprise an amino acid sequence of from 4 to 50 amino acids, wherein the amino sequence of B' is the same as or different from the amino acid sequence of B; b and b' are each an integer from 0 to 3, wherein the integer of b' is the same as or different from the integer of b; and i is an integer from 1 to 100.

A method of the present invention comprises selecting at least one repeat sequence protein polymer; selecting at least one metal oxide or at least one plasticizer; preparing a solution of the at least one repeat sequence protein polymer and a solution of the at least one metal oxide; mixing together the solution of the at least one repeat sequence protein polymer and the solution of the at least one metal oxide to form a mixture; and placing the mixture on a surface and allowing a film to form.

The invention is directed to compositions comprising composites consisting of a metal oxide or a plasticizer and one or more repeat sequence protein polymers. In a first embodiment of the invention, the metal oxide is titanium, yttrium, and/or germanium oxide, and the repeat sequence protein polymer is a co-polymer comprising sequences derived from silk and elastin termed SELP.

In a second embodiment of the invention the plasticizer is polyethylene glycol and or glycerol and the repeat sequence protein polymer is co-polymer comprising sequences derived from SELP.

The compositions of the present invention are composites that demonstrate material property enhancements relative to the RSPP alone.

In the first embodiment, the composites are mixtures of metal oxides and recombinant protein wherein the mixture demonstrates self-assembly of the protein into nanofilaments that further align and orient into a generally parallel pattern.

In the second embodiment, the composites are mixtures of plasticizers and recombinant protein wherein the composite have improved properties as compared with just the recombinant protein properties. The composites have improved elasticity as shown by elastic modulus values that are at least 10%, at least 20%, at least 30%, at least 40%, at least 50%, at least 60%, at least 70%, at least 80%, at least 90%, and at least 100% greater than the elastic modulus values of the RSPP alone. The protein-based composite of repeat sequence protein polymer and plasticizer produces a repeat sequence protein polymer with properties suitable for use of the composite as suture material, as a tissue scaffold, artificial tissue, or biodegradable structural material, including industrial materials.

The composites of the present invention may also retain variable percentages of the water, or other solvents used to make the composites as well as other additives selected to tailor properties of the composites.

This invention also describes methods for the formation of composites consisting of a metal oxide and repeat sequence protein polymers and composites consisting of plasticizers and repeat sequence protein polymers.

The method comprises adding metal oxides, or plasticizers with a solution of a repeat sequence protein polymer. The resulting mixture of the metal oxide and repeat sequence protein polymer may be spin-cast into a film that has self-assembled, aligned and oriented repeat sequence protein nanofilaments.

The amount of metal oxide added to the SELP material solution may be selected to provide a composite with desired nanofilament, self-orientation, and alignment properties. The amount of plasticizer added to the SELP material solution may be selected to provide a composite with desired elastic modulus properties.

DETAILED DESCRIPTION OF THE INVENTION

Figure 1:
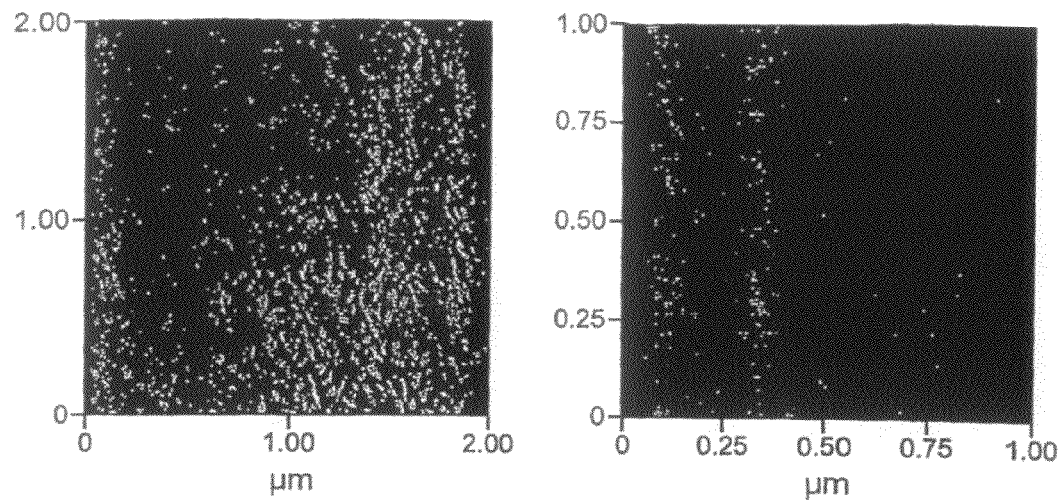
FIG. 1 is an atomic force microscopy view of a SELP47K RSPP film.

The present invention is directed to compositions that are composites of a metal oxide material and one or more repeat sequence protein polymers. In this first embodiment of the invention, the metal oxide material is a titanium, yttrium and/or germanium oxide, and the repeat sequence protein polymer is a co-polymer having sequences derived from silk and elastin, termed SELP. The composites of the first embodiment are highly aligned nanofilaments produced under controlled conditions.

In the second embodiment of the invention the repeat sequence protein polymer is SELP and the plasticizer is polyethylene glycol and/or glycerol, and controlled conditions are used to tailor the elastic modulus of the resulting composite.

The invention further includes methods for the formation of composites. The method adds to a solution of repeat sequence protein polymer either a metal oxide or plasticizer with mixing and/or sonication. The resulting mixture of the repeat protein polymer and the metal oxide may be spin cast into a film, retaining varying amounts of water or other solvent. Additives may be used and added to select properties of the composites.

DEFINITIONS

For purposes of this invention, the following definitions shall apply:

"Elastic modulus", or modulus of elasticity means a measurement that expresses the ability of a material to return to its original dimension after the removal of stresses, calculated by the formula $E=S/\delta$, where S is the unit stress and $\delta$ is the unit strain. The composites of the present invention have an elastic modulus that is at least 10%, at least 20%, at least 30%, at least 40%, at least 50%, at least 60%, at least 70%, at least 80%, at least 90%, at least 100% greater than the elastic modulus of the RSPP without the addition of the plasticizer material.

An "Aligned or oriented nanofilament composite" means a composite morphology where the nanofilaments are positioned generally in alignment with one another in the composite. The RSPP material alone, without the addition of the metal oxide demonstrates no significant alignments or orientation of nanofilaments with respect to each other when examined by atomic force microscopy.

"Material properties" means tensile strength, elastic modulus, and morphology. The composites of the present invention demonstrate an improvement, when compared to repeat sequence protein polymers alone, of one or more mechanical properties.

A "composite" means a material composed of two or more physically distinct materials in close contact.

A "nanofilament" means that the RSPP material has self-assembled into a thread-like morphology, where at least one of the dimensions of the thread is in the nanometer size range (i.e. smaller than 1000 nanometers).

"Tensile Strength" as applied to a composite means the maximum stress which can be applied in a tension test prior to breakage (failure) of the composite. The value is determined from the slope of the modulus.

Repeat Sequence Protein Polymers

The repeat sequence protein polymer (RSPP) can be any modified polypeptide with at least two distinct domains repeated throughout the entire sequence two or more times.

The at least two distinct repeating domains of the RSPPs suitable for the present invention may be derived from modifying a natural, chemically modified, recombinant protein, or mixtures thereof. For example, the repeating sequence units may be derived from modifying natural structure supporting materials such as silk, elastin, and collagen. Alternatively, the repeating sequence units may be derived from synthetic or designed structures.

One skilled in the art will appreciate the various naturally occurring proteins containing repeating sequence units, which can be modified and used for designing and producing the repeat sequence protein polymers of the present invention, any of which may be employed herein. Specifically, there are more than six hundred repeating amino acid sequence units known to exist in biological systems. The natural OR synthetic protein repeating amino acid sequence units are derived from modifications made to elastin, collagen, abductin, byssus, extensin, flagelliform silk, dragline silk, gluten high molecular weight subunit, titin, fibronectin, leminin, gliadin, glue polypolypeptide, ice nucleating protein, keratin mucin, RNA polymerase II, resalin or a mixture thereof.

RSPP repeating sequence units for the natural or synthetic materials listed above are described and the amino acid sequences are shown in WO 04080426A1, which is incorporated herein in its entirety.

The repeat sequence protein polymer (RSPP) formula comprises:

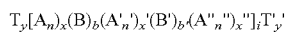

wherein: T and T' each comprise an amino acid sequence of from 1 to 100 amino acids, wherein the amino acid sequence of T' is the same as or different from the amino acid sequence of T; y and y' are each an integer from 0 to 1, wherein the integer of y' is the same as or different from the integer of y; A, A' and A" are each individual repeating amino acid sequence units comprising from 3 to 30 amino acids, wherein the amino acid sequence of A' and the amino acid sequence of A" are the same as or different from the amino acid sequence of A; n, n', and n" are each integers of at least 2 and not more than 250; x, x' and x" are each 0 or an integer of at least 1, wherein each integer varies to provide for at least 30 amino acids in the A', A' and A" individual amino acid sequence repeating units, and wherein the integer of x' and the integer of x" are the same as or different from the integer of x and x, x', and x, x' and x" cannot all be equal to zero; B and B' each comprise an amino acid sequence of from about 4 to about 50 amino acids, wherein the amino acid sequence of B' is the same as or different from the amino acid sequence of B; b and b' are each an integer from 0 to 3, wherein the integer of b' is the same as or different from the integer of b; and i is an integer from 1 to 500.

The repeating amino acid sequence units may comprise identical repeating sequence units or may comprise different repeating sequence unit combinations, which join together to form a block copolymer or an alternating block copolymer. Additionally, the individual repeating amino acid sequence units of the repeat sequence protein polymer comprise from 3 to 30 amino acids or from 3 to 8 amino acids. Moreover, the same amino acid may appear at least twice in the same repeating sequence unit.

It will be further understood by those having skill in the art that the repeat sequence protein polymers of the present invention may be monodispersed or polydispersed. For purposes of defining and describing the present invention, "monodispersed" polymers are polymers having a single defined molecular weight. For purposes of defining and describing the present invention, "polydispersed" polymers are polymers that have been subjected to proteolysis or other means of subdivision, and have a distribution of molecular weights.

In one embodiment, the copolymers are combinations of silk units and elastin units to provide silk-elastin copolymers having properties distinctive from polymers having only the same monomeric unit.

A silk-elastin polymer, SELP47K, may be used as the repeat sequence protein polymer of the present invention. The SELP47K is a homoblock protein polymer that consists exclusively of silk-like crystalline blocks and elastin-like flexible blocks. SELP47K is a modified material of 70% proline, valine, and alanine, and has hydrophobic characteristics. The repeat sequence protein polymer may also comprise SELP47-E13, SELP47R-3, SELP47K-3, SELP47E-3, SELP67K, and SELP58.

In one embodiment of the invention, the structure of the silk elastin-like protein is Head-$(S_2E_3E_KE_4S_2)_{13}$-Tail, where S is the silk-like sequence of amino acids GAGAGS, E is the elastin-like sequence GVGVP, and $E_K$ is the elastin like sequence modified with a lysine residue GKGVP. The head sequence of amino acids is MDPVVLQRRD WENPGVTQLN RLAAHPPFAS DPM and the tail sequence is AGAGSGAGAM DPGRYQDLRS HHHHHH. The copolymer contains 886 amino acids, with 780 amino acids in the repeating sequence unit. The SELP47K has a molecular weight of about 70,000 Daltons, and a pI of 10.5. The properties of other SELP variants are shown below in Table 1.

TABLE 1

SELP variants, properties.

| Variant Name | Number of Subunits | Lysine Substitution | Molecular Weight (Da) | Isoelectric Point |
|---|---|---|---|---|
| SELP47E | 13 | Glutamic Acid | 70,212 | 4.16 |
| SELP47K-3 | 3 | none | 20,748 | 9.52 |
| SELP47R-3 | 3 | Arginine | 20,960 | 10.5 |
| SELP47E-3 | 3 | Glutamic Acid | 20,879 | 5.9 |
| SELP27K | 13 | none | 59,401 | 10.53 |
| SELP37K | 13 | none | 64,605 | 10.53 |
| SELP58 | 13 | none | 74,765 | 6.7 |
| SELP67K | 13 | none | 80,347 | 10.53 |

One skilled in the art will appreciate the various methods for producing the repeat sequence protein polymers of the present invention, any of which may be employed herein. For example, the repeat sequence protein polymer may be produced by generally recognized methods of chemical synthesis, for example, L Andersson et. al., *Large-scale synthesis of peptides*, Biopolymers 55(3), 227-50 (2000)); genetic manipulation (for example, J. Cappello, Genetically Engineered Protein Polymers, Handbook of Biodegradable Polymers, Domb, A. J.; Kost, J.; Wiseman, D. (Eds.), Harvard Academic Publishers, Amsterdam; pages 387-414); and enzymatic synthesis (for example, C. H. Wong & K. T. Wang, *New Developments in Enzymatic Peptide Synthesis*, Experientia 47(11-12), 1123-9 (1991)). For example, the repeat sequence protein polymers of the present invention may be produced using the methods described in U.S. Pat. Nos. 5,243,038; 6,355,776; and WO 07080426A1 the disclosures of which are incorporated by reference herein. In another example, the repeat sequence protein polymers may be produced utilizing non-ribosomal peptide synthase (for example, H. V. Dohren, et al., Multifunctional Peptide Synthase, Chem. Rev. 97, 2675-2705 (1997).

The *E. coli* strains containing a specific silk-elastin repeat sequence protein copolymer SELP47K, SELP37K and SELP27K recombinant DNA were also obtained from Protein Polymer Technologies, Inc. of San Diego, Calif. SELP67K, SELP58, SELP37K and SELP27K variant proteins were produced in 14 L fed batch culture using standard SELP47K production protocols, as described above. Proteins were purified and characterized as follows: 40 grams of cell pastes collected from 14 L cultures were lysed via French-press followed by the addition of polyethyleneimine (0.8 w/v %). Centrifugation was used to separate the cellular debris from the cell extract. SELP polymers were precipitated from the cell extract using ammonium sulfate (30% saturation), collected by centrifugation and reconstituted in water.

The protocol used for the genetic engineering of variants SELP47E, SELP47K-3, SELP47R-3, and SELP47E-3 is a modification of a commercially available kit designed to create single base pair changes in multiple sites along a particular DNA sequence (QUIKCHANGE® Multi (Site-Directed Mutagenesis Kit), Stratagene cat #200513). The standard protocol involves the construction of single direction 5' phosphorylated primers that will hybridize to plasmid template regions of interest and incorporate point mutations. Thermocycling is employed that includes a ligation reaction designed to link the multiple primers during each round of synthesis.

Metal Oxides

The metal oxide materials suitable for the present invention are any metal oxide, for instance, aluminum oxide, silicon dioxide, magnesium oxide, zirconium oxide, titanium oxide, yttrium oxide, and/or germanium oxide. Preferred metal oxides are titanium, yttrium and germanium oxides.

The concentration by weight of metal oxide used in the present composite invention is about 0.001% to about 10%, about 0.001 to about 5%, about 0.01% to about 10%, about 0.01% to about 5%, and about 0.01% to about 2%.

The composites may retain variable amounts of the water or other solvents. For instance, the composites may retain at least about 15%, at least about 10%, at least about 5%, at least about 1% of water or other solvents.

The composites may include additives to tailor and vary properties. For instance, additives may be hydroxyapatite, polyethylene oxide, polypropylene oxide, poly(lactide-co-glycolide) (PLGA), poly lactic acid, caprolactones, polyethylene imine, dextran, carbohydrates, DNA, silicones, silanes, poly acrylic acids, hyaluronic acid, fatty acids, talc, ionic, and or nonionic surfactants, or combinations thereof.

In the second embodiment of the present invention, the plasticizer may be a low molecular weight organic compound, such as sugars, (glucose, fructose and sucrose for example), polyols (for example, sorbitol, xylitol and maltitol or other glycols), polar low molecular weight organic compounds, such as urea or other amines, or other known plasticizer such as water or glycerol. Preferred plasticizers are polyethylene glycol and glycerol. The amount of the plasticizer may be selected to tailor the elastic modulus of the composite as desired. The plasticizer may constitute 10%, 8%, 6%, 4%, 2%, 1%, 0.5% w/w of the composite.

The following examples are included to illustrate embodiments of the invention and are not intended to be limiting thereof.

EXAMPLES

Example 1

Production of Silk-Elastin Like Protein (SELP)

Monodispersed silk-elastin protein polymer SELP47K was produced by fermenting a recombinant *E. coli* strain to produce a cell-paste containing monodispersed SELP47K as described in US2004/0180027A1. The cell-paste is placed in ice-cold water and homogenized to make the cell extract. The cell-extract is mixed with polyethyleneimine and a filter-aid and allowed to sit at 7° C. for one hour. The polyethyeleneimine causes precipitation of cell debris and a significant amount of *E. coli* proteins. The SELP47K containing reaction mixture is then filtered using a cell debris separation device, such as a centrifuge, microfiltration device, or Rotary Drum Vacuum Filter (RVDF). The filtered SELP47K solution is then mixed with ammonium sulfate to 25% saturation, which leads to precipitation of SELP47K. Precipitated SELP47K and mother liquor is mixed with a filter-aid and again filtered using RVDF. The RVDF cake containing SELP47K and filter-aid is mixed with cold water to dissolve the SELP47K. This precipitation and solubilization step is repeated to improve the purity profile of the SELP47K. Purified monodispersed SELP47K is then water-exchanged until the conductivity of SELP solution reached 50 $\mu S/cm^2$. The monodispersed SELP solution was then concentrated to 10% wt/vol and then lyophilized to make powdered monodispersed SELP47K protein polymer. The material was stored at −70° C. until needed for composite material preparation, material properties testing, and application testing.

Example 2

Preparation of the RSPP/Metal Oxide Composites

A 13% solution of SELP47K in water was prepared and then mixed with 0.01 wt/wt % of three metal oxides (titanium, yttrium, germanium). The three resulting mixtures were then spin-casted into thin films on a stainless steel substrate to a thickness of 2 µm to form SELP47K/metal oxide composite protein films.

Example 3

Film Analysis by Atomic Force Microscopy (AFM)

The films from Example 2 were analyzed by AFM. The AFM instrument used in this study was a Digital Instruments Nanoscope. The scan size was 1 µM and the scan rate was 2.815 Hz. The number of scans collected was 512 and the amplitude was from 0.11 to 0.15 V. The data Z-range height was 15 nm. Control SELP47K films, without metal oxides, have a morphological structure with self-assembled nanofilaments, but the filaments are not aligned or oriented with respect to each other, as shown in FIG. 1.

Figure 2:
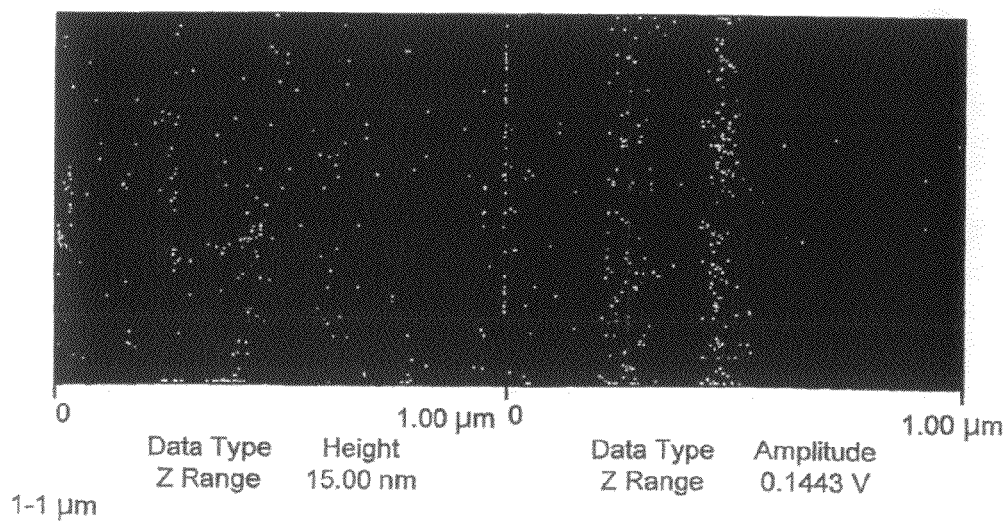
FIG. 2 is an atomic force microscopy view of a composite SELP47K RSPP film of the present invention containing 0.01% titanium oxide.
Figure 3:
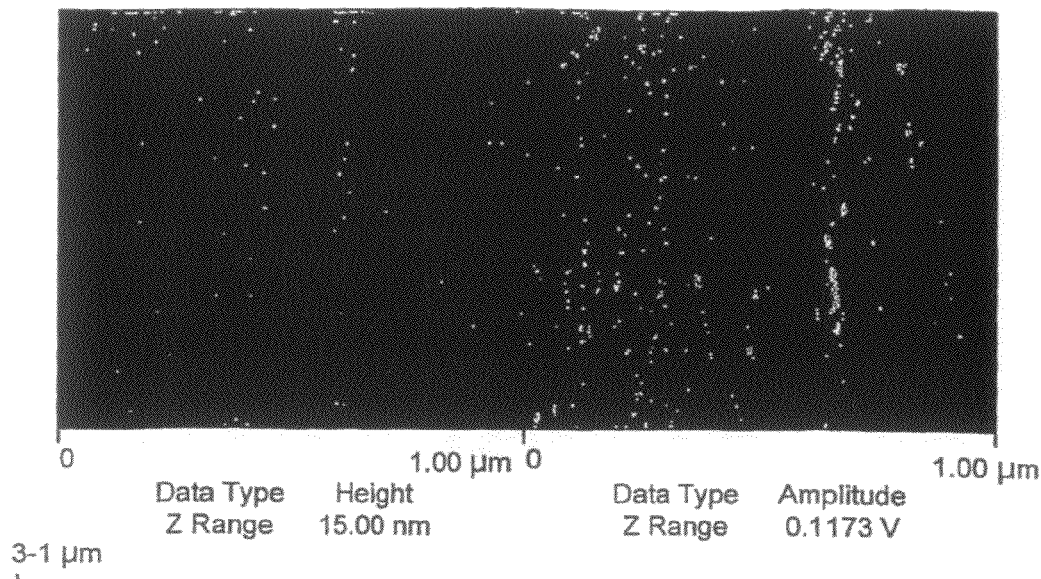
FIG. 3 is an atomic force microscopy view of another composite film of the present invention containing SELP47K and 0.01% germanium oxide.
Figure 4:
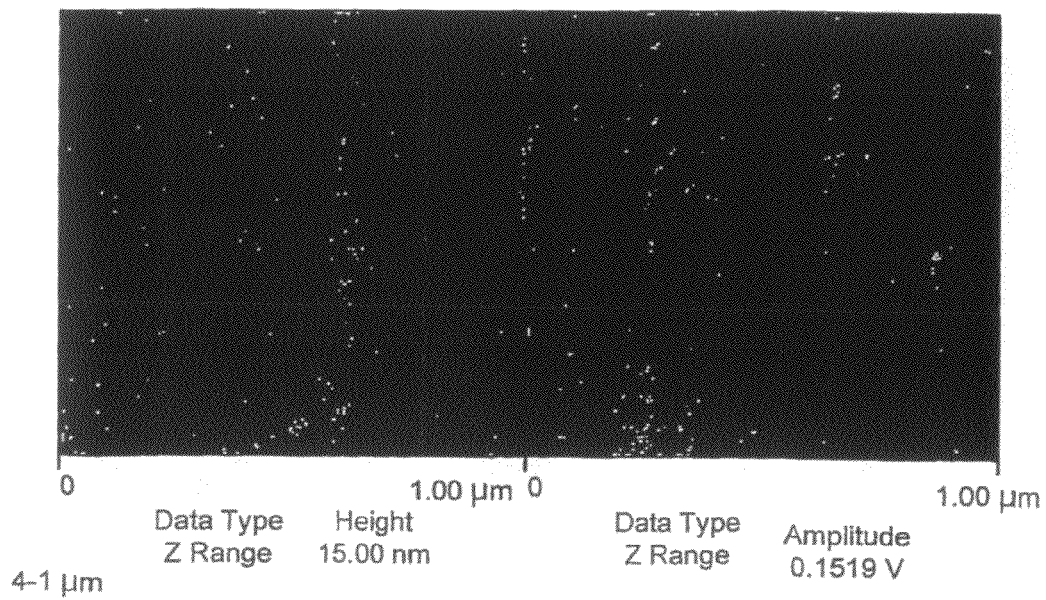
FIG. 4 is an atomic force microscopy view of yet another composite film of the present invention containing SELP47K and 0.01% yttrium oxide.

With the presence of metal oxides, SELP47K both self-assembled into nanofilaments and the nanofilaments were aligned and oriented with respect to each other in a generally parallel fashion as shown in FIGS. 2, 3, and 4.

Example 4

Preparation of SELP and Plasticizer Composites

Twenty percent (20%) SELP47K solutions were mixed with 2% wt/wt plasticizers, specifically PEG 200 and glycerol. Films of these composite materials were cast and analyzed for material properties using an Instron test device. The results in Table 1 below show that the plasticizers improved the elastic modulus of the SELP polymer materials.

TABLE 1

| Protein Polymer | Elastic Modulus % | Tensile Strength (MPa) |
|---|---|---|
| SELP47K | 8.4 | 65.90 |
| SELP47K + 2% PEG | 541.7 | 42.25 |
| SELP47K + 2% Glycerol | 180 | 27.65 |

What is claimed is:

1. A composite comprising at least one repeat sequence protein polymer and at least one metal oxide, wherein the morphology of the composite comprises oriented and aligned nanofilaments.

2. The composite of claim 1, wherein a formula of the repeat sequence protein polymer comprises:

$$T_y[(A_n)_x(B)_b(A'_{n'})_{x'}(B')_{b'}(A''_{n''})_{x''}]_iT'_{y'}$$

wherein:

T and T' each comprise an amino acid sequence of from 1 to 100 amino acids, wherein the amino acid sequence of T' is the same as or different from the amino acid sequence of T;

y and y' are each an integer from 0 to 1, wherein the integer of y' is the same as or different from the integer of y;

A, A' and A" are each individual repeating sequence units comprising from 3 to 30 amino acids, wherein the amino acid sequence of A' and the amino acid sequence of A" are the same as or different from the amino acid sequence of A;

n, n', and n" are integers of at least 2 and not more than 250;

x, x' and x" are each 0 or an integer of at least 1, wherein each integer varies to provide for at least 30 amino acids in the A, A' and A" individual repeating sequence units, and wherein the integer of x' and the integer of x" are the same as or different from the integer of x;

B and B' each comprise an amino acid sequence of from about 4 to about 50 amino acids, wherein the amino sequence of B' is the same as or different from the amino acid sequence of B;

b and b' are each an integer from 0 to 3, wherein the integer of b' is the same as or different from the integer of b; and i is an integer from 1 to 100.

3. The composite of claim 1, wherein the at least one metal oxide is selected from titanium oxide, yttrium oxide, germanium oxide, aluminum oxide, silicon dioxide, and zirconium oxide.

4. The composite of claim 1, wherein the at least one metal oxide is selected from titanium oxide, yttrium oxide, and germanium oxide.

5. The composite of claim 1, wherein the nanofilaments are aligned and oriented generally parallel.

6. The composite of claim 1, wherein the concentration by weight of the at least one metal oxide is from 0.001% to 10% of the composite.

7. The composite of claim 1, wherein the concentration by weight of the at least one metal oxide is from 0.01% to 2% of the composite.

8. A composite comprising a repeat sequence protein polymer having a formula comprising:

$$T_y[(A_n)_x(B)_b(A'_{n'})_{x'}(B')_{b'}(A''_{n''})_{x''}]_iT'_{y'}$$

wherein:

T and T' each comprise an amino acid sequence of from 1 to 100 amino acids, wherein the amino acid sequence of T' is the same as or different from the amino acid sequence of T;

y and y' are each an integer from 0 to 1, wherein the integer of y' is the same as or different from the integer of y;

A, A' and A" are each individual repeating sequence units comprising from 3 to 30 amino acids, wherein the amino acid sequence of A' and the amino acid sequence of A" are the same as or different from the amino acid sequence of A;

n, n', and n" are integers of at least 2 and not more than 250;

x, x' and x" are each 0 or an integer of at least 1, wherein each integer varies to provide for at least 30 amino acids in the A, A' and A" individual repeating sequence units, and wherein the integer of x' and the integer of x" are the same as or different from the integer of x;

B and B' each comprise an amino acid sequence of from about 4 to about 50 amino acids, wherein the amino sequence of B' is the same as or different from the amino acid sequence of B;

b and b' are each an integer from 0 to 3, wherein the integer of b' is the same as or different from the integer of b; and i is an integer from 1 to 100; and at least one metal oxide that is 0.01% by weight of the composite, the at least one metal oxide selected from titanium oxide, yttrium oxide, germanium oxide, aluminum oxide, silicon dioxide, and zirconium oxide, wherein the morphology of the composite comprises oriented and aligned nanofilaments.

9. The composite of claim 8, wherein the at least one metal oxide is selected from titanium oxide, yttrium oxide, and germanium oxide.

10. The composite of claim 8, wherein the nanofilaments are aligned and oriented generally parallel.

11. A method for making a composite, the method comprising:

selecting at least one repeat sequence protein polymer;

selecting at least one metal oxide;

preparing a solution of the at least one repeat sequence protein polymer and a solution of the at least one metal oxide;

mixing together the solution of the at least one repeat sequence protein polymer and the solution of the at least one metal oxide to form a mixture; and placing the mixture on a surface and allowing a film to form, wherein the morphology of the composite comprises oriented and aligned nanofilaments.

12. The method of claim 11, wherein placing the mixture on a surface comprises casting the mixture as a film or a hydrogel onto the surface.

13. The method of claim 11, wherein the at least one metal oxide is selected from titanium oxide, yttrium oxide, germanium oxide, aluminum oxide, silicon dioxide, and zirconium oxide.

14. The method of claim 11, wherein the at least one metal oxide is selected from titanium oxide, yttrium oxide, and germanium oxide.

15. The method of claim 11, wherein the concentration by weight of the at least one metal oxide is from 0.001% to 10% of the composite.

16. The method of claim 11, wherein the concentration by weight of the at least one metal oxide is about 0.01% to about 2% of the composite.

17. The method of claim 11, wherein the repeat sequence protein polymer has the formula as defined in claim 2.

18. The method of claim 11, wherein the nanofilaments are aligned and oriented generally parallel.

* * * * *